US012431633B2

(12) United States Patent
Morioka et al.

(10) Patent No.: US 12,431,633 B2
(45) Date of Patent: Sep. 30, 2025

(54) COMMUNICATION MODULE AND ELECTROMAGNETIC FLUX CONTROLLING MEMBER USED FOR THE SAME

(71) Applicant: Enplas Corporation, Saitama (JP)

(72) Inventors: Shimpei Morioka, Saitama (JP); Takayoshi Suganuma, Saitama (JP); Hiroshi Takatori, Saitama (JP)

(73) Assignee: Enplas Corporation, Saitama (JP)

( * ) Notice: Subject to any disclaimer, the term of this patent is extended or adjusted under 35 U.S.C. 154(b) by 116 days.

(21) Appl. No.: 18/398,230

(22) Filed: Dec. 28, 2023

(65) Prior Publication Data

US 2024/0222879 A1 Jul. 4, 2024

(30) Foreign Application Priority Data

Jan. 4, 2023 (JP) ................................ 2023-000274

(51) Int. Cl.
*H01Q 15/08* (2006.01)
*H01Q 19/06* (2006.01)

(52) U.S. Cl.
CPC .................................. *H01Q 19/06* (2013.01)

(58) Field of Classification Search
CPC ....... H01Q 15/08; H01Q 19/06; H01Q 19/062
See application file for complete search history.

(56) References Cited

U.S. PATENT DOCUMENTS 3,866,234 A * 2/1975 Gates, Jr. ............... H01Q 15/08 343/872
5,264,859 A * 11/1993 Lee ...................... H01Q 1/3233 343/753
5,952,984 A 9/1999 Kuramoto et al.
6,195,058 B1 * 2/2001 Nakamura ............. H01Q 19/08 343/753
7,190,324 B2 * 3/2007 Henderson ............... H01Q 1/34 343/753
11,374,330 B2 * 6/2022 Basnev .................... H01Q 3/46
11,385,384 B2 * 7/2022 Diehl ................... G02B 3/0087
12,164,122 B2 * 12/2024 Suganuma ............. H01Q 15/10

FOREIGN PATENT DOCUMENTS

JP 09-321533 12/1997

OTHER PUBLICATIONS

Ansarudin et al. "Multi Beam Dielectric Lens Antenna for 5G Base Station", Sensors, 20(20): 5849-1-5849-17, Oct. 16, 2020.

* cited by examiner

*Primary Examiner* — Tho G Phan

(57) ABSTRACT

A communication module including a primary radiator for transmitting an electromagnetic flux, and an electromagnetic flux controlling member for controlling a travelling direction of the electromagnetic flux sent from the primary radiator. The electromagnetic flux controlling member includes an incidence surface and an emission surface. The incidence surface and the emission surface are configured such that the electromagnetic flux emitted is expanded than the electromagnetic flux transmitted from a focal position of a reference lens optimized to collimate the electromagnetic flux from the primary radiator and emitted after incidence on the reference lens on a basis of an emission angle of the electromagnetic flux emitted from the primary radiator, a dielectric constant of the electromagnetic flux controlling member, and an arbitrarily set focal length of the electromagnetic flux controlling member.

18 Claims, 12 Drawing Sheets

COMMUNICATION MODULE AND ELECTROMAGNETIC FLUX CONTROLLING MEMBER USED FOR THE SAME

This application claims the benefit priority of Japanese Patent Application No. 2023-000274, filed on Jan. 4, 2023, the contents of which are incorporated by reference as if fully set forth herein in their entirety.

TECHNICAL FIELD

The present invention relates to a communication module and an electromagnetic flux controlling member used for the same.

BACKGROUND ART

In radio communication, it is known to use a lens antenna formed of a dielectric material as a means for transmitting more information with high efficiency over long distances. Lens antennas have a function of controlling the travelling direction of electromagnetic waves such as a function of converting spherical waves into plane waves, and are increasingly used for radio waves with short wavelengths such as quasi-millimeter waves, millimeter waves, and terahertz waves in recent years. In recent years, communications using millimeter waves and terahertz waves of 5G and 6G standards have been studied, and lens antennas have attracted attention as a high-gain antenna.

In the related art, a lens antenna is used in combination with a horn antenna. Lens antennas are optimized to achieve most significant effects when separated from a horn antenna by a focal length. Here, a configuration is known in which the curvature of a spherical surface, an aspherical surface or a free curved surface of a lens antenna is optimized by a certain calculation algorithm (e.g., NPL 1).

NPL 1 discloses a method of optimizing the incidence surface or the emission surface on the basis of a focal length of a lens antenna, the dielectric constant of the dielectric material making up the lens antenna, and the angle of the electromagnetic waves transmitted from the horn antenna.

In addition, as a method of fixing the lens antenna as described above, a method in which it is directly fixed to a flange of a horn antenna is known (see, for example, PTL 1). Further, as another method of fixing as lens antenna, there is a method in which it is fixed such that the center of the dielectric lens antenna and the horn antenna coincide with each other while maintaining a certain distance from the horn antenna by using a fixation jig.

CITATION LIST

Patent Literature

PTL 1

Japanese Patent Application Laid-Open No. H9-321533

Non Patent Literature

NPL 1

Farizah Ansarudin, et al., “Multi Beam Dielectric Lens Antenna for 5G Base Station”, Sensors, Volume 20, Issue 20, 5849.

SUMMARY OF INVENTION

Technical Problem

The lens antennas disclosed in NPL 1 and PTL 1 have a size 10 to 20 times greater than the wavelength to be used, and therefore it is easy to perform positioning of the lens antenna and the horn antenna.

However, in recent years, as the wavelength used becomes shorter, the sizes of the lens antenna and the horn antenna decrease, which requires high positioning accuracy. As such, the methods disclosed in NPL 1 and PTL 1 may not achieve accurate positioning of the lens antenna and the horn antenna, resulting in the coupling loss.

In view of this, an object of the present invention is to provide a communication module and an electromagnetic flux controlling member used for the same that can suppress the coupling loss even in the case where the position of the electromagnetic flux controlling member with respect to the primary radiator is displaced.

Solution to Problem

The present invention relates to the following communication module and the electromagnetic flux controlling member used for the same.

[1] A communication module including: a primary radiator configured to transmit an electromagnetic flux; and an electromagnetic flux controlling member configured to control a travelling direction of the electromagnetic flux sent from the primary radiator, in which the electromagnetic flux controlling member includes: an incidence surface configured to allow incidence of the electromagnetic flux sent from the primary radiator, and an emission surface configured to emit to outside the electromagnetic flux entered from the incidence surface, and in which the incidence surface and the emission surface are configured such that the electromagnetic flux emitted from the emission surface is expanded than the electromagnetic flux transmitted from a focal position of a reference lens optimized to collimate the electromagnetic flux from the primary radiator and emitted after incidence on the reference lens on a basis of an emission angle of the electromagnetic flux emitted from the primary radiator, a dielectric constant of the electromagnetic flux controlling member, and an arbitrarily set focal length of the electromagnetic flux controlling member.

[2] The communication module according to [1], in which the reference lens includes: a reference incidence surface corresponding to the incidence surface and configured to allow incidence of the electromagnetic flux, and a reference emission surface corresponding to the emission surface and configured to emit, to outside, the electromagnetic flux entered from the reference incidence surface.

[3] The communication module according to [1] or [2], in which when an absolute value of a vertex curvature radius of the reference incidence surface is greater than an absolute value of a vertex curvature radius of the reference emission surface when the absolute value of the vertex curvature radius of the reference incidence surface and the absolute value of the vertex curvature radius of the reference emission surface are compared with each other, a vertex curvature radius of the incidence surface is the same as the vertex curvature radius of the reference incidence surface, and an absolute value of a vertex curvature radius of the emission surface that is a convex surface is greater than the absolute value of the vertex curvature radius of the reference emission surface.

[4] The communication module according to [1] or [2], in which when an absolute value of a vertex curvature radius of the reference emission surface is greater than an absolute value of a vertex curvature radius of the reference incidence surface when the absolute value of the vertex curvature radius of the reference incidence surface and the absolute value of the vertex curvature radius of the reference emission surface are compared with each other, a vertex curvature radius of the emission surface is the same as the vertex curvature radius of the reference emission surface, and an absolute value of a vertex curvature radius of the incidence surface that is a concave surface is smaller than the absolute value of the vertex curvature radius of the reference incidence surface.

[5] The communication module according to any one of [1] to [4], in which when a distance between the primary radiator and a reception part configured to receive the electromagnetic flux sent from the primary radiator is 5 m, the primary radiator and the reception part including a receiver are modules with the same configuration, and the primary radiator is disposed near the electromagnetic flux controlling member than the focal position of the reference lens, a coupling loss of the electromagnetic flux transmitted from the primary radiator and received by the reception part is within a range of 0 to −61 dB.

[6] The communication module according to any one of [1] to [4], in which when the primary radiator and a reception part configured to receive the electromagnetic flux sent from the primary radiator are separated from each other by a certain distance, the primary radiator and the reception part including a receiver use modules with the same configuration, and the primary radiator is disposed near the electromagnetic flux controlling member than the focal position of the reference lens, a coupling loss of the electromagnetic flux transmitted from the primary radiator and received by the reception part is within a range of 0 to −61 dB.

[7] The communication module according to any one of [1] to [6], in which the electromagnetic flux is a millimeter wave, a quasi-millimeter wave, or a terahertz wave.

[8] The communication module according to any one of [1] to [7], in which an alignment layer configured to suppress reflection of the electromagnetic flux is disposed at the incidence surface or the emission surface.

[9] The communication module according to any one of [1] to [8], in which the alignment layer is a plurality of protrusions.

[10] An electromagnetic flux controlling member configured to be used for the communication module according to any one of [1] to [9].

Advantageous Effects of Invention

According to the present invention, it is possible to the coupling loss can be suppressed even in the case where the position of the electromagnetic flux controlling member is displaced with respect to primary radiator.

DESCRIPTION OF EMBODIMENTS

Embodiments according to the present invention are elaborated below with reference to the accompanying drawings.

Embodiment 1

Configuration of Communication Module

Figure 1:
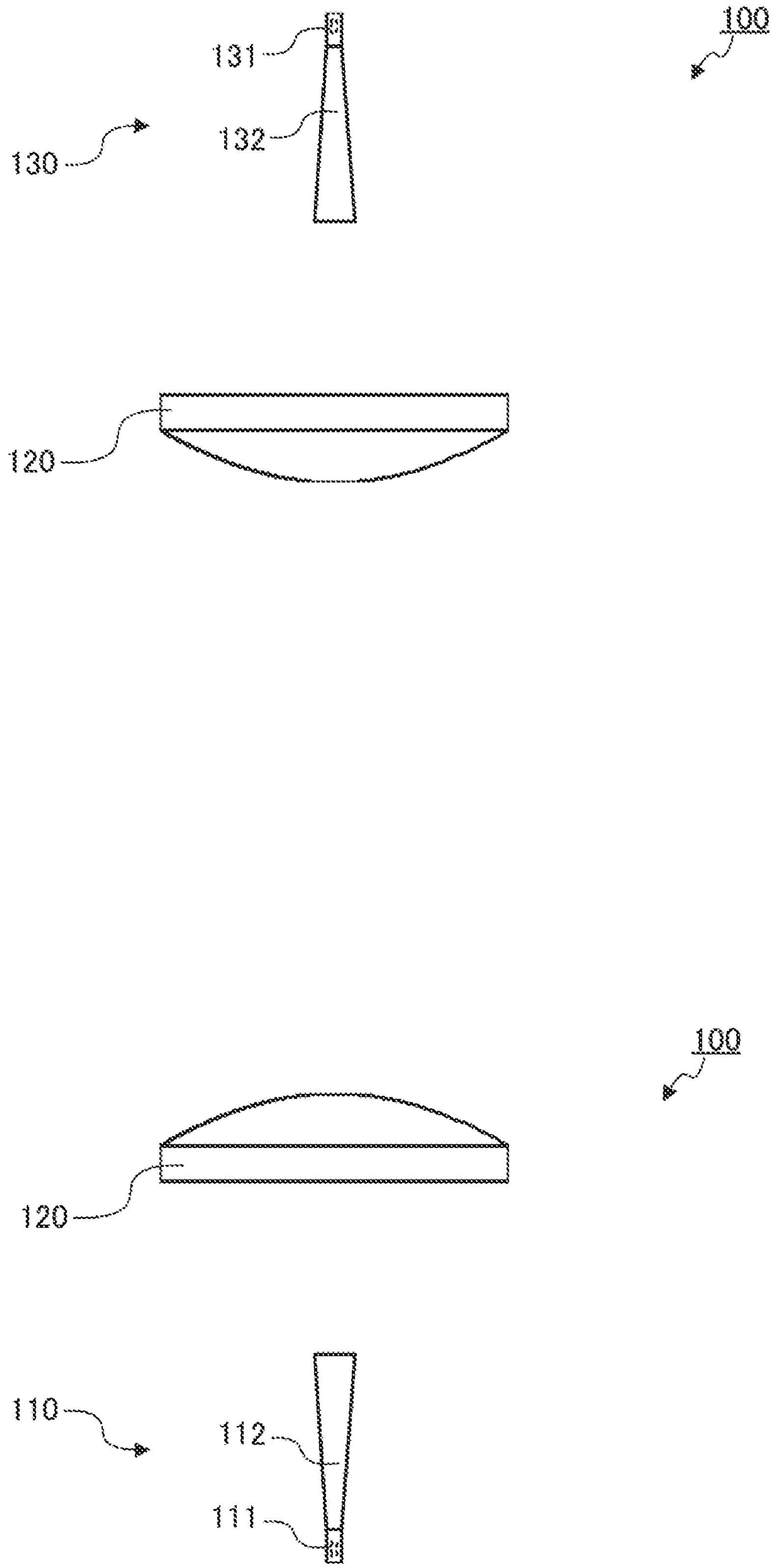
FIG. 1 illustrates a configuration of a communication module of Embodiment 1.
Figure 2A:
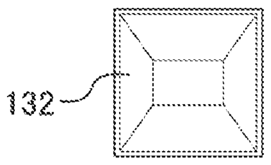
FIGS. 2A to 2C illustrate a configuration of a horn antenna in Embodiment 1.
Figure 2B:
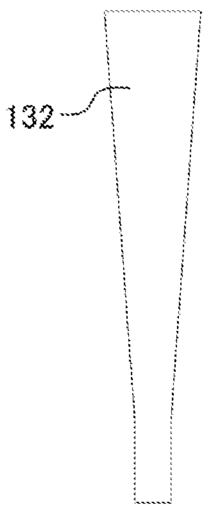
Figure 2C:
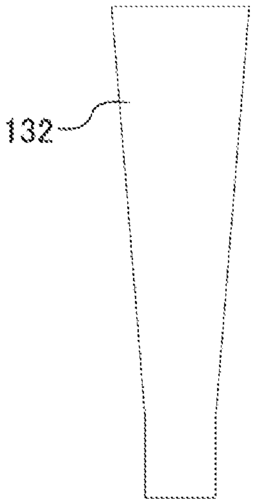

FIG. 1 is a schematic view illustrating a configuration of communication module 100 of Embodiment 1. FIGS. 2A to 2C are diagrams illustrating a configuration of a horn antenna. FIG. 2A is a plan view of the horn antenna, FIG. 2B is a right side view, and FIG. 2C is a front view.

As illustrated in FIG. 1 and FIGS. 2A to 2C, communication module 100 includes primary radiator 110 and electromagnetic flux controlling member 120. Communication module 100 may be used as a transmission module, a reception module, or both a transmission module and a reception module. In the present embodiment, it may be used as both a transmission module and a reception module. Specifically, in the present embodiment, communication module 100 serving as a transmission module includes primary radiator 110 and electromagnetic flux controlling member 120. On the other hand, communication module 100 serving as a reception module includes electromagnetic flux controlling member 120 and reception part 130. It is preferable that primary radiator 110 and reception part 130 be the module with the same configuration. Primary radiator 110 includes radio wave source 111 and first antenna 112. As such, reception part 130 includes receiver 131 and second antenna 132.

Radio wave source 111 transmits an electromagnetic flux of a predetermined wavelength. The type of radio wave source 111 is not limited as long as the above-mentioned function can be ensured, and publicly known radio wave sources may be used. Preferably, the type of the electromagnetic flux transmitted from radio wave source 111 is millimeter waves, quasi-millimeter waves, or terahertz waves. The wavelength of the electromagnetic waves used for electromagnetic flux controlling member 120 of the present embodiment is, but not limited to, within a range of 1 to 10 mm, for example.

First antenna 112 controls, toward electromagnetic flux controlling member 120, the electromagnetic flux sent from radio wave source 111 with a predetermined expansion range. First antenna 112 is not limited as long as the above-mentioned function can be ensured. Examples of the type of first antenna 112 include a horn antenna and a patch antenna. In the present embodiment, first antenna 112 is a horn antenna (see FIGS. 2A to 2C). For example, the horn antenna has an upper opening with a size of 2.5 mm long×1.8 mm wide, and a lower opening with a size of 0.9 mm long×0.4 mm wide, with a length of 6 mm. The upper opening and lower opening both have a rectangular shape. In addition, in the present embodiment, radio wave source 111 is disposed 1 mm above the lower opening of horn antenna.

Receiver 131 receives the electromagnetic flux transmitted from radio wave source 111. The type of receiver 131 is not limited as long as the above-mentioned function can be ensured, and publicly known receivers may be used.

Second antenna 132 controls the electromagnetic flux sent from radio wave source 111 such that the electromagnetic flux gathers toward receiver 131. Second antenna 132 is not limited as long as the above-mentioned function can be ensured. Examples of the type of second antenna 132 include a horn antenna and a patch antenna. In the present embodiment, second antenna 132 is a horn antenna (see FIGS. 2A to 2C). For example, the horn antenna has an upper opening with a size of 2.5 mm long×1.8 mm wide, and a lower opening with a size of 0.9 mm long×0.4 mm wide, with a length of 6 mm. The upper opening and lower opening both have a rectangular shape. In addition, in the present embodiment, receiver 131 is disposed 1 mm above the lower opening of horn antenna on the upper opening side.

First antenna 112 included in primary radiator 110 and first antenna 112 included in reception part 130 may have the same shape or different shapes. As described above, in the present embodiment, first antenna 112 included in primary radiator 110 and second antenna 132 included in reception part 130 have the same shape.

Configuration of Electromagnetic Flux Controlling Member

Figure 3A:
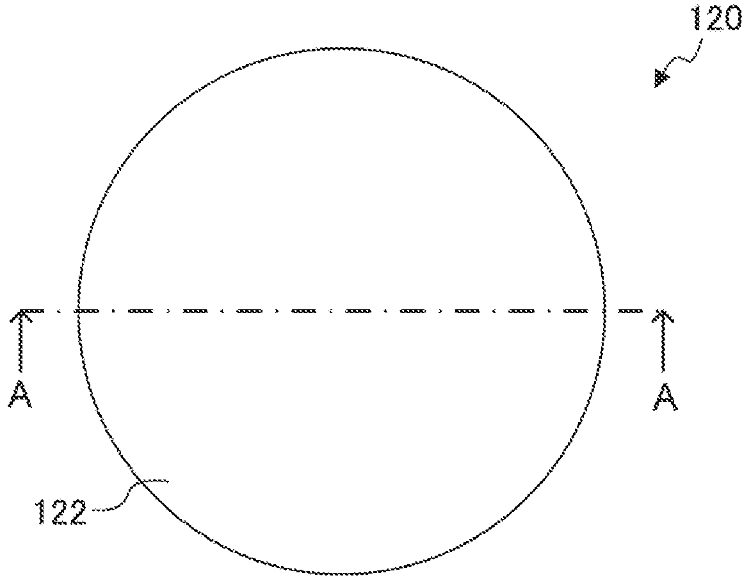
FIGS. 3A to 3C illustrate a configuration of the electromagnetic flux controlling member of Embodiment 1.
Figure 3B:
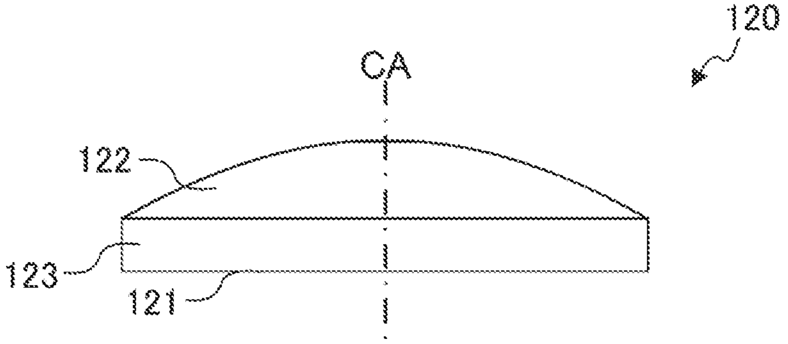
Figure 3C:
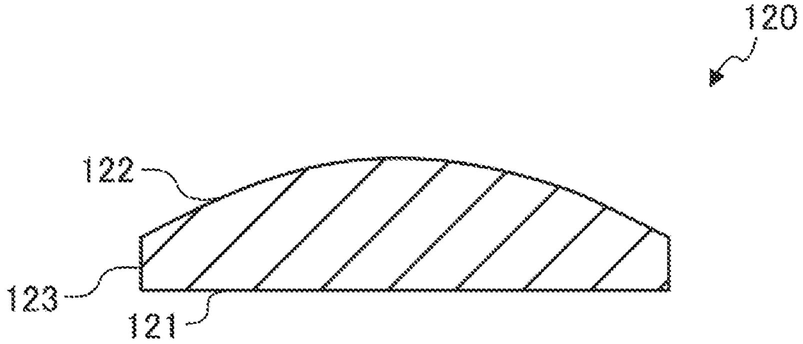

FIG. 3A is a plan view of electromagnetic flux controlling member 120, FIG. 3B is a front view, and FIG. 3C is a sectional view taken along line A-A of FIG. 3A.

Here, electromagnetic flux controlling member 120 included in the transmission module is described. Electromagnetic flux controlling member 120 controls the travelling direction of electromagnetic flux (electromagnetic waves) sent from primary radiator 110. More specifically, electromagnetic flux controlling member 120 controls the electromagnetic flux sent from primary radiator 110 such that the electromagnetic flux travels in an expanding manner. As illustrated in FIGS. 3A to 3C, electromagnetic flux controlling member 120 includes incidence surface 121 and emission surface 122. Note that in the present embodiment, electromagnetic flux controlling member 120 further includes side surface 123 disposed on the lateral side.

The material of electromagnetic flux controlling member 120 is not limited as long as the effects of the present invention can be achieved, and is appropriately selected from among the materials that can transmit the electromagnetic flux to be controlled. Examples of the material of electromagnetic flux controlling member 120 include ceramics, resin, and glass. Examples of the resin include polypropylene, poly cycloolefin, polytetrafluoroethylene, and modified polyphenylene ether. Examples of the ceramics include $CaTiO_3$, $SrTiO_3$, $BaTiO_3$, and ZnO. In addition, examples of the material of electromagnetic flux controlling member 120 include the above-described resin containing powder of the above-described ceramic.

In the present embodiment, electromagnetic flux controlling member 120 is rotationally symmetrical (circularly symmetrical) about central axis CA extending in the front-to-back direction as the rotation axis. In addition, in the present embodiment, the height (thickness) of electromagnetic flux controlling member 120 is 5 mm, and the diameter is 10 mm in plan view. In addition, central axis CA is central axis CA of incidence surface 121, central axis CA of emission surface 122, and central axis CA of side surface 123.

Incidence surface 121 allows the electromagnetic flux to enter electromagnetic flux controlling member 120, and travel in the predetermined direction. The shape of incidence surface 121 is not limited as long as the above-mentioned function can be ensured, and is appropriately set in accordance with the shape of emission surface 122. Incidence surface 121 may be a flat surface or a concave surface. Incidence surface 121 is disposed to intersect central axis CA of electromagnetic flux controlling member 120. In the present embodiment, the shape of incidence surface 121 is a shape of a flat surface and is rotationally symmetrical about central axis CA as the rotation axis (circularly symmetrical). Note that details of the method of setting incidence surface 121 are described later.

Emission surface 122 emits to the outside of electromagnetic flux controlling member 120 the electromagnetic waves entered from incidence surface 121, such that the electromagnetic flux travels in a predetermined direction. The shape of emission surface 122 is not limited as long as the above-mentioned function can be ensured, and is appropriately set in accordance with the shape of incidence surface 121 and the like. In the present embodiment, emission surface 122 is disposed to intersect central axis CA. In the present embodiment, the shape of emission surface 122 is a shape of a convex surface and is rotationally symmetrical about central axis CA as the rotation axis (circularly symmetrical). Note that details of the method of setting emission surface 122 are described later.

Specifically, in the present embodiment, a configuration in which emission surface 122 is a convex surface and incidence surface 121 is a flat surface, and a configuration in which emission surface 122 is a convex surface and incidence surface 121 is a concave surface (see FIG. 5B) are conceivable.

Side surface 123 is disposed between incidence surface 121 and emission surface 122. Side surface 123 is connected at one end to the outer edge of incidence surface 121, and at the other end to the outer edge of emission surface 122. In the present embodiment, side surface 123 has a shape of a side surface of a column. In the case where electromagnetic flux controlling member 120 does not include side surface 123, the outer edge of incidence surface 123 and the outer edge of emission surface 122 are directly connected to each other.

Note that electromagnetic flux controlling member 120 included in the reception module controls the travelling direction of the electromagnetic flux (electromagnetic waves) sent from electromagnetic flux controlling member 120 included in the transmission module. In electromagnetic flux controlling member 120 included in the reception module, incidence surface 121 of electromagnetic flux controlling member 120 included in the transmission module functions as the emission surface, and emission surface 122 thereof functions as the incidence surface. Other configurations are the same as those of electromagnetic flux controlling member 120 included in the transmission module.

Now details of the method of setting incidence surface 121 and emission surface 122 are described below. Incidence surface 121 or emission surface 122 in electromagnetic flux controlling member 120 of the present embodiment is set based on reference lens 520. In view of this, first, reference lens 520 is described.

Figure 4A:
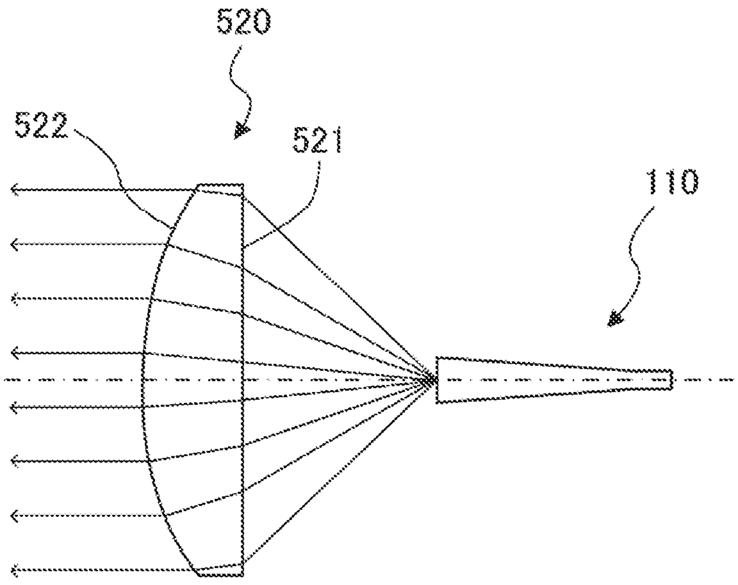
FIGS. 4A and 4B illustrate light paths of a reference lens and the electromagnetic flux controlling member of Embodiment 1.

FIG. 4A is a diagram illustrating light paths of the electromagnetic flux in reference lens 520. As illustrated in FIG. 4A, reference lens 520 is a lens optimized to collimate the electromagnetic flux sent from primary radiator 110. Reference lens 520 includes reference incidence surface 521 corresponding to incidence surface 121 of electromagnetic flux controlling member 120 and configured to allow incidence of the electromagnetic flux, and reference emission surface 522 corresponding to emission surface 122 of electromagnetic flux controlling member 120 and configured to emit to the outside the electromagnetic flux entered from reference incidence surface 521. Note that in the present embodiment, reference incidence surface 521 is a flat surface, and reference emission surface 522 is a convex surface. The electromagnetic flux sent from primary radiator 110 enters reference lens 520 from reference incidence surface 521, and is emitted out of reference lens 520 from reference emission surface 522. At this time, the electromagnetic flux emitted from reference emission surface 522 is parallel. Reference lens 520 is optimized to collimate the electromagnetic flux sent from radio wave source 111 on the basis of the emission angle of the electromagnetic flux transmitted from primary radiator 110, the dielectric constant of electromagnetic flux controlling member 120, and the arbitrarily set focal length of electromagnetic flux controlling member 120 on the basis of the above-described NPL 1 (Farizah Ansarudin, et al., "Multi Beam Dielectric Lens Antenna for 5G Base Station", Sensors, Volume 20, Issue 20, 5849). Here, in the present embodiment, the focal position means the position of the focal point of a case where collimated light is entered from reference emission surface 522 and emitted from reference incidence surface 521.

Figure 4B:
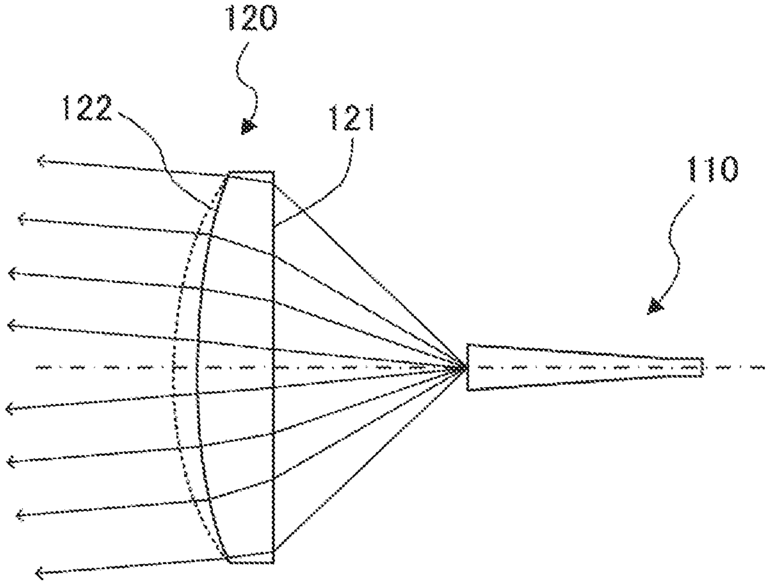

FIG. 4B is a diagram illustrating light paths of the electromagnetic flux in electromagnetic flux controlling member 120 of the present embodiment. Electromagnetic flux controlling member 120 of the present embodiment is configured to expand the electromagnetic flux than the parallel electromagnetic flux emitted after transmission from the focal position of reference lens 520 and incidence on reference lens 520. In the present embodiment, incidence surface 121 of electromagnetic flux controlling member 120 and/or the shape of emission surface 122 are slightly different from reference incidence surface 521 or reference emission surface 522 of reference lens 520. Preferably, incidence surface 121 or emission surface 122 of electromagnetic flux controlling member 120 are set to satisfy the following conditions.

First, the absolute value of the vertex curvature radius of reference incidence surface 521 and the absolute value of the vertex curvature radius of reference emission surface 522 are compared with each other. Here, the vertex curvature radius means the curvature radius at the vertices of reference incidence surface 521, reference emission surface 522, incidence surface 121 or emission surface 122. Note that the vertex of incidence surface 121 composed of a flat surface means the center of incidence surface 121, and the curvature radius of the flat surface is infinite. In the case where the absolute value of the vertex curvature radius of reference incidence surface 521 is greater than the absolute value of the vertex curvature radius of reference emission surface 522, the vertex curvature radius of incidence surface 121 is the same as the vertex curvature radius of reference incidence surface 521. That is, in the present embodiment, the shape of emission surface 122 is slightly different from reference emission surface 522.

In the present embodiment, reference incidence surface 521 of reference lens 520 is a flat surface, and reference emission surface 522 is a convex surface. Specifically, in the present embodiment, the absolute value (infinite) of the vertex curvature radius of reference incidence surface 521 is greater than the absolute value of the vertex curvature radius of reference emission surface 522. In this case, preferably, the absolute value of the vertex curvature radius of emission surface 122 composed of a convex surface is greater than the absolute value of the vertex curvature radius of reference emission surface 522. In other words, preferably, the absolute value of the curvature at the vertex of emission surface 122 is smaller than the absolute value of the curvature at the vertex of reference emission surface 522.

Note that in the present embodiment, the absolute value of the curvature radius at the vertex is used, but the absolute values of the curvature radiuses of arbitrary points, or the absolute values of the curvature radiuses in predetermined regions may be compared with each other.

Modifications

Next, a transmission module of a modification of the present embodiment is described. Note that the transmission module of the modification is different from communication module 100 of Embodiment 1 only in the configuration of electromagnetic flux controlling member 220. In view of this, only the configuration of electromagnetic flux controlling member 220 is described below. The same components as those of Embodiment 1 are denoted with the same reference numerals, and the description thereof will be omitted.

Figure 5A:
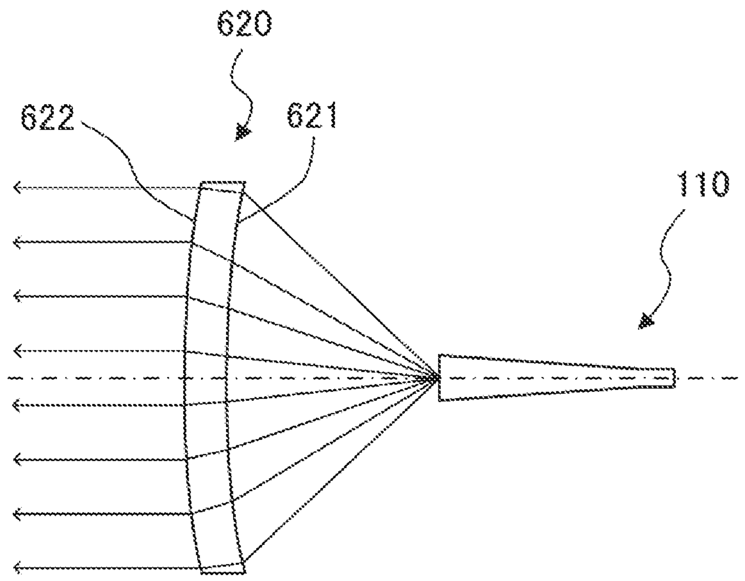
FIGS. 5A and 5B illustrate light paths of a reference lens and an electromagnetic flux controlling member of modification 1 of Embodiment 1.
Figure 5B:
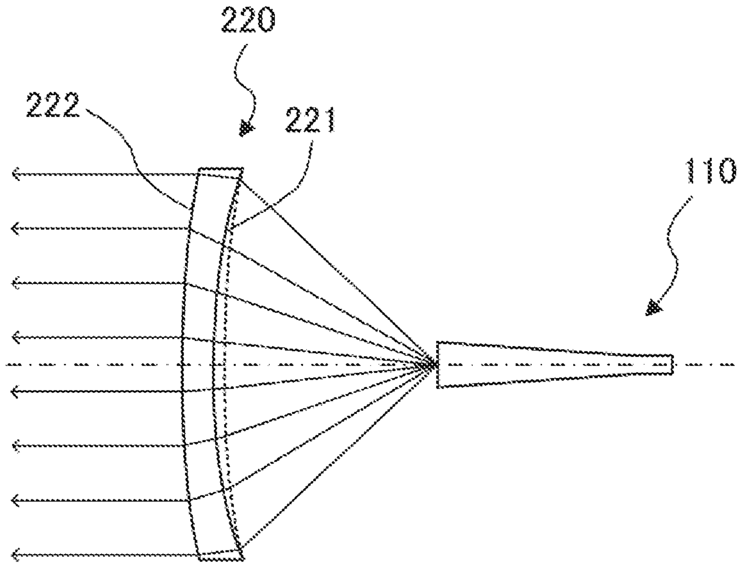

FIG. 5A is a diagram illustrating light paths of the electromagnetic flux in, and FIG. 5B is a diagram illustrating light paths of the electromagnetic flux in reference lens 620 in a modification.

As illustrated in FIGS. 5A and 5B, electromagnetic flux controlling member 220 of the present modification includes incidence surface 221 and emission surface 222. In the present modification, incidence surface 221 is a concave surface, and emission surface 222 is a convex surface.

Reference lens 620 of the modification includes reference incidence surface 621 and reference emission surface 622. Note that in the modification, reference incidence surface 621 is a concave surface, and reference emission surface 622 is a convex surface. Also in the modification, the electromagnetic flux emitted from reference emission surface 622 of reference lens 620 is parallel.

In the modification, in the case where the absolute value of the vertex curvature radius of reference emission surface 622 is greater than the absolute value of the vertex curvature radius of reference incidence surface 621, the vertex curvature radius of emission surface 222 is the same as the vertex curvature radius of reference emission surface 622. That is, in this case, the shape of incidence surface 221 is slightly different from that of reference incidence surface 621. More specifically, preferably, the absolute value of the vertex curvature radius of incidence surface 221 composed of a concave surface is greater than the absolute value of the vertex curvature radius of reference incidence surface 621. In other words, preferably, the absolute value of the curvature at the vertex of incidence surface 221 is smaller than the absolute value of the curvature at the vertex of reference incidence surface 621.

Effects

With communication module 100 according to the present embodiment, the electromagnetic flux emitted from electromagnetic flux controlling members 120 and 220 is controlled in an expanded manner, and thus the coupling loss can be suppressed even in the case where the positions of electromagnetic flux controlling members 120 and 220 displaced with respect to primary radiator 110.

Embodiment 2

Configuration of Communication Module

Next, transmission module 400 according to Embodiment 2 is described. Communication module 400 according to the present embodiment is different from communication module 100 according to Embodiment 1 in the configuration of electromagnetic flux controlling member 420. In view of this, in the present embodiment, electromagnetic flux controlling member 420 is mainly described. In addition, the same configurations as those of communication module 100 of Embodiment 1 are denoted with the same reference numerals and the description thereof will be omitted.

Figure 6:
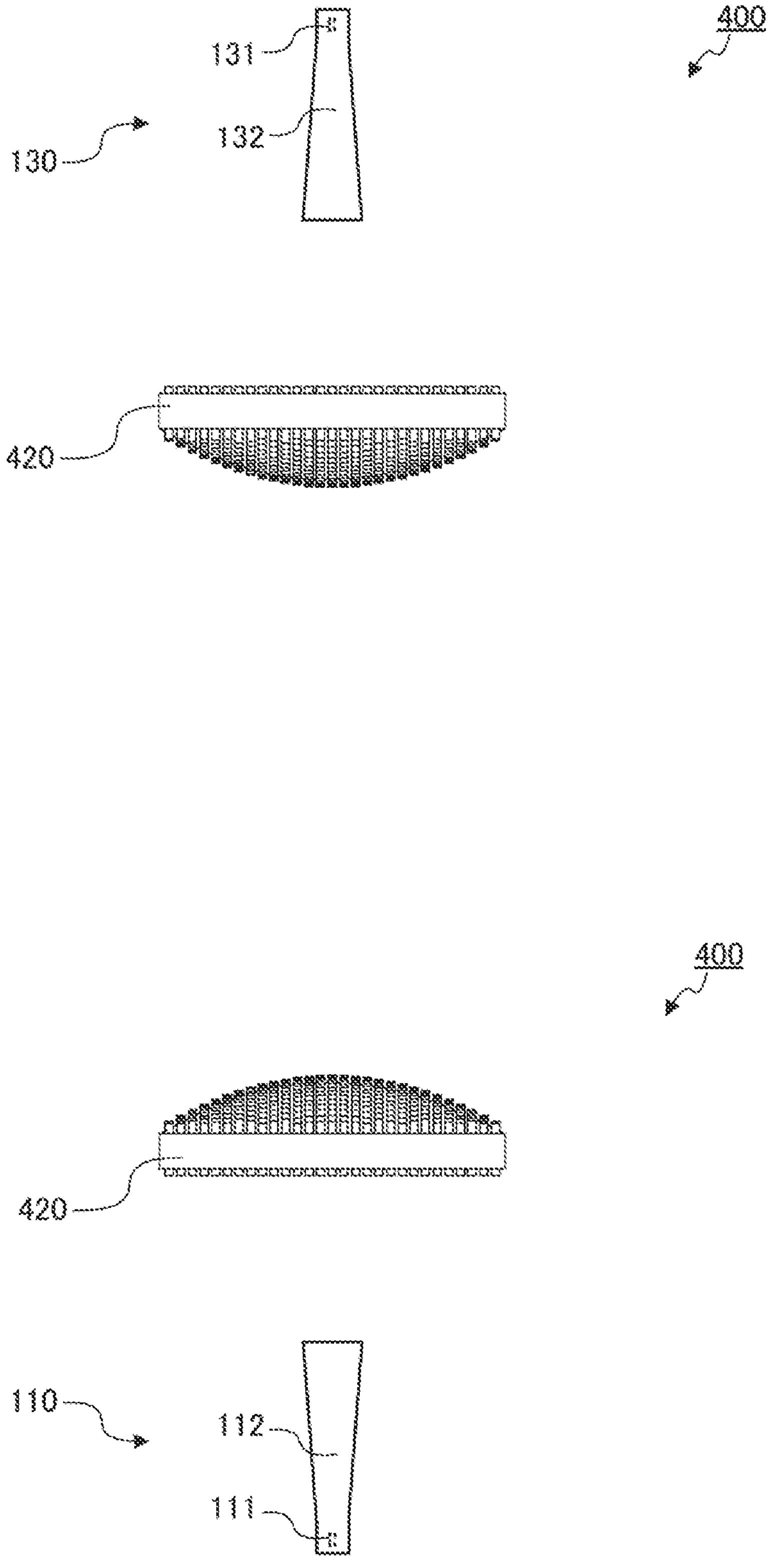
FIG. 6 illustrates a configuration of a communication module of Embodiment 2.
Figure 7A:
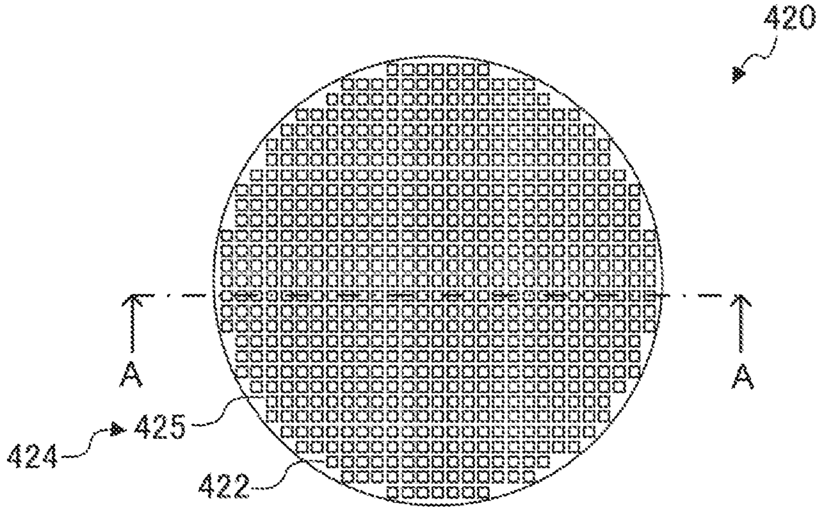
FIGS. 7A to 7C illustrate a configuration of an electromagnetic flux controlling member of Embodiment 2.
Figure 7B:
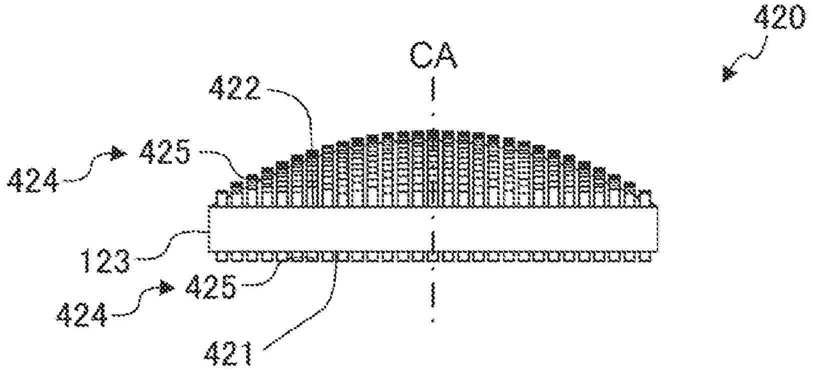
Figure 7C:
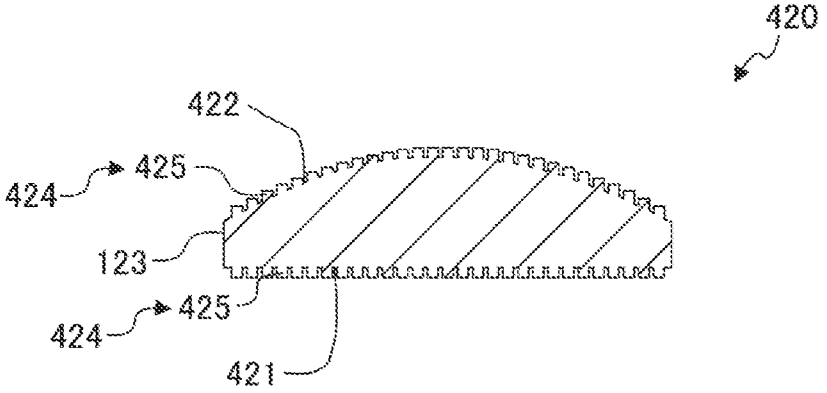

FIG. 6 is a diagram illustrating a configuration of communication module 400 according to Embodiment 2. FIGS. 7A to 7C are diagrams illustrating a configuration of electromagnetic flux controlling member 420 according to Embodiment 2.

As illustrated in FIG. 6, communication module 400 includes primary radiator 110 and electromagnetic flux controlling member 420. In the present embodiment, communication module 100 serving as a transmission module includes primary radiator 110 and electromagnetic flux controlling member 420. On the other hand, communication module 100 serving as a reception module includes electromagnetic flux controlling member 420 and reception part 130.

As illustrated in FIGS. 7A to 7C, electromagnetic flux controlling member 420 includes incidence surface 421 and emission surface 422. Alignment layer 424 is disposed at incidence surface 421 or emission surface 422. Note that in the present embodiment, alignment layer 424 is disposed at incidence surface 421 and emission surface 422.

Except in alignment layer 424, incidence surface 421 may be a flat surface or a concave surface. In the present embodiment, incidence surface 421 is a flat surface except in alignment layer 424. In addition, emission surface 422 is a convex surface except in alignment layer 424.

Alignment layer 424 suppresses the reflection of the electromagnetic flux. The configuration of alignment layer 424 is not limited as long as the above-mentioned function can be ensured. Alignment layer 424 may be a reflection film for reflecting the electromagnetic flux, or a plurality of protrusions 425. In the present embodiment, a plurality of protrusions 425 as alignment layer 424 is disposed in incidence surface 421 and emission surface 422. Specifically, the plurality of protrusions 425 is disposed on the flat surface in incidence surface 421, and the plurality of protrusions 425 is disposed on the convex surface in emission surface 422.

The portion where protrusion 425 is provided is a layer composed of a combination of air and the material such as the resin making up protrusion 425. In this manner, the layer functions as a layer with a refractive index between the refractive index of the air and the refractive index of the material. Thus, with protrusion 425, reflection of the electromagnetic flux incident on incidence surface 421 and the electromagnetic flux emitted from emission surface 422 due to abrupt variation of the refractive index is suppressed.

The shape of protrusion 425 is not limited as long as the above-mentioned function can be ensured. The shape of protrusion 425 may be a shape (e.g., column) that does not change in the direction away from the surface (incidence surface 421 or emission surface 422) of electromagnetic flux controlling member 420, or a shape (e.g., cone or frustum) that changes in that direction. However, from a view point of softening the change of the refractive index, it is preferable that protrusion 425 have a shape tapered in the direction away from the surface of electromagnetic flux controlling member 420.

Examples of the shape of protrusion 425 include rectangular prisms, columns, pyramids, cones, truncated pyramids, and truncated cones. Among them, pyramids, cones, truncated pyramids, truncated cones are preferable from a view point of softening the variation of the refractive index.

The size of protrusion 425 may be appropriately selected in accordance with the wavelength of the electromagnetic waves to be prevented from being reflected. For example, for the frequency band of 300 GHz, it suffices that the maximum length of protrusion 425 in plan view is about 200 to 500 μm, and that the height of protrusion 425 is about 200 to 500 sm. In addition, for example, for the frequency band of 100 GHz, it suffices that the maximum length of protrusion 425 in plan view is about 600 to 1500 μm, and that the height of protrusion 425 is about 600 to 1500 μm. In addition, preferably, the size of protrusion 425 is half or smaller the wavelength of the electromagnetic waves, and is the process limitation or larger.

In addition, preferably, protrusion 425 has a shape with no side where the angle between two surfaces is 90° or less from a view point of achieving good releasability. In view of this, preferably, the protrusion has a chamfered rectangular prism shape, a chamfered pyramid trapezoidal shape, a chamfered pyramid shape, or the like. Preferably, the chamfering is provided at the top surface and/or the base of protrusion 425. Examples of the chamfering include C-chamfering and R-chamfering.

Note that in the present embodiment, protrusion 425 is a quadrangular prism with chamfered eight sides.

Effects

Communication module 400 according to the present embodiment has the same effects as those of the communication module of Embodiment 1. In addition, communication module 400 according to the present embodiment includes alignment layer 424, and thus can prevent the reflection of the electromagnetic flux.

Simulations

Next, the coupling loss in the communication module was examined.

In the case where the distance between primary radiator 110 and reception part 130 for receiving the electromagnetic flux sent from primary radiator 110 was set to 5 m, and primary radiator 110 and reception part 130 including receiver 131 are the modules with the same configuration, and, primary radiator 110 is disposed near electromagnetic flux controlling member 120 than the focal position of the reference lens, the coupling loss of the electromagnetic flux transmitted from primary radiator 110 and received by transmitted reception part 130 is preferably within the range of 0 to −61 dB. In addition, in the case where a certain distance is provided between primary radiator 110 and reception part 130 for receiving the electromagnetic flux sent from primary radiator 110, and primary radiator 110 and reception part 130 including receiver 131 are the modules with the same configuration, and, primary radiator 110 is disposed near electromagnetic flux controlling member 120 than the focal position of reference lens 520, the coupling loss of the electromagnetic flux transmitted from primary radiator 110 and received by transmitted reception part 130 is preferably within the range of 0 to −61 dB.

The coupling loss was examined with different distances between primary radiator 110 and reception part 130. The frequency of the electromagnetic flux transmitted from radio wave source 111 was set to 270 GHz. As first antenna 112 of primary radiator 110 and second antenna 132 of reception part 130, a horn antenna for 270 GHz was used. The distance between primary radiator 110 and reception part 130 was set to 300, 500, 1000, 2000, 5000, 8000, and 10000 mm. Note that in this simulation, the electromagnetic flux controlling member is not used.

Figure 8A:
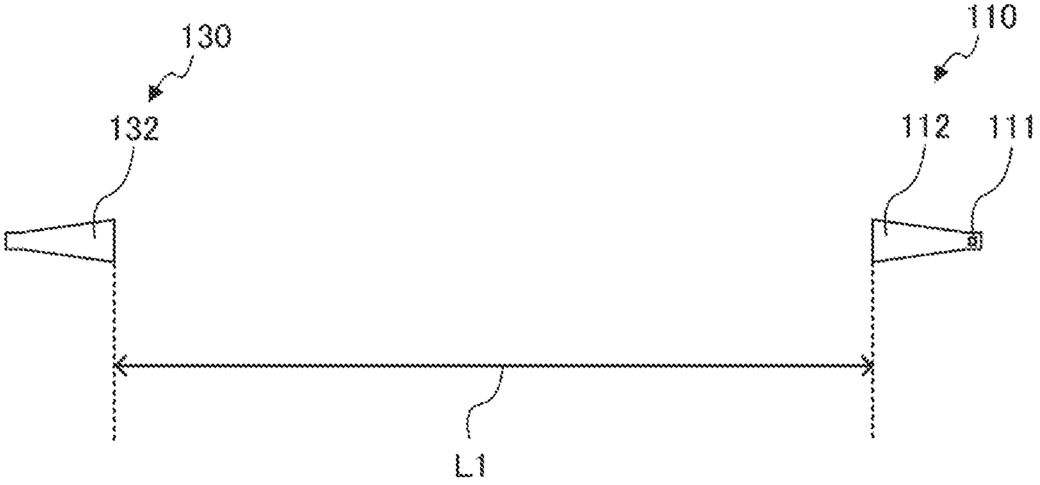
FIGS. 8A and 8B are diagrams for describing a relationship between a distance between a primary radiator and a reception part, and coupling loss of an electromagnetic flux.
Figure 8B:
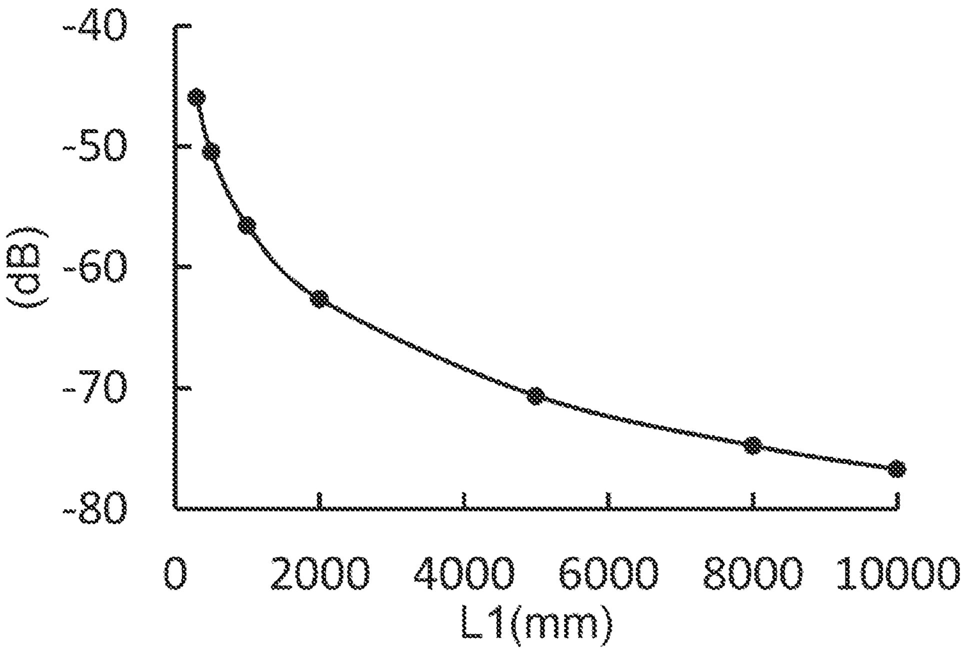

FIGS. 8A and 8B are diagrams for describing a relationship between the distance between primary radiator 110 and reception part 130 and the coupling loss of the electromagnetic flux. FIG. 8A is a diagram illustrating a device configuration of the present simulation, and FIG. 8B is a graph showing a simulation result. In FIG. 8B, the abscissa indicates the distance L1 (mm) between primary radiator 110 and reception part 130, and the ordinate indicates coupling loss (dB). As illustrated in FIGS. 8A and 8B, as the distance L1 between primary radiator 110 and reception part 130 increases, coupling loss increases.

Next, the influence on the coupling loss when the position of primary radiator 110 is displaced in the plane direction (the Y direction in FIG. 9A) was examined. The frequency of the electromagnetic flux transmitted from radio wave source 111 was set to 270 GHz. As first antenna 112 and second antenna 132, a horn antenna for 270 GHz was used. The deviation amount of primary radiator 110 was set to 1.0, 5.0, 10, 50, 100 and 500 mm. The distance between primary radiator 110 and reception part 130 was set to 5000 mm. Note that in this simulation, the electromagnetic flux controlling member is not used.

Figure 9A:
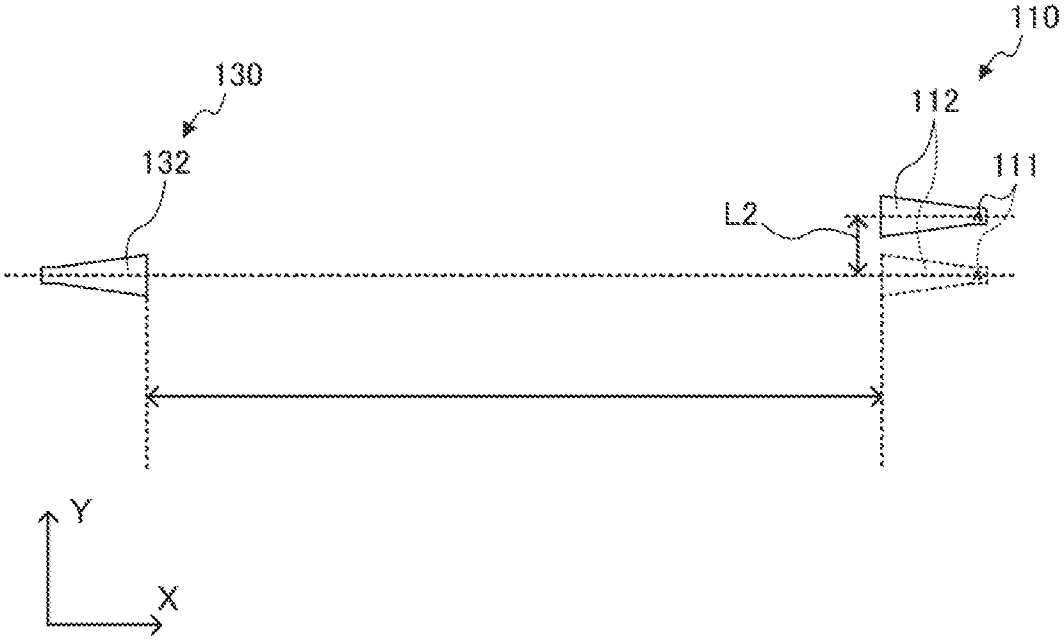
FIGS. 9A and 9B are diagrams for describing a relationship between a deviation amount of the primary radiator and the coupling loss of the electromagnetic flux.
Figure 9B:
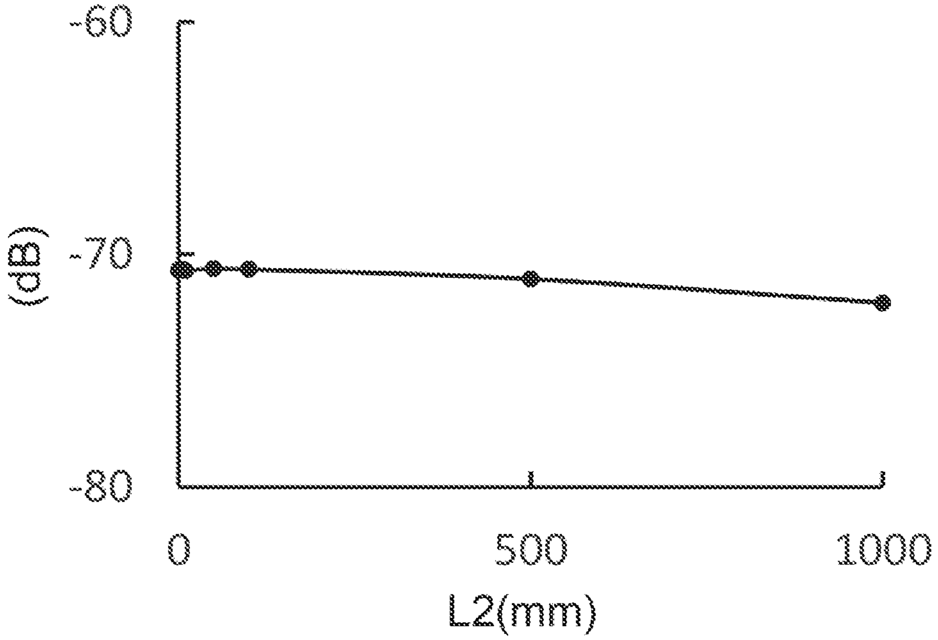

FIGS. 9A and 9B are diagrams for describing a relationship between the deviation amount of primary radiator 110 and the coupling loss of the electromagnetic flux. FIG. 9A is a diagram illustrating a device configuration of the present simulation, and FIG. 9B is a graph showing a simulation result. In FIG. 9B, the abscissa indicates deviation amount L2 (mm) of primary radiator 110, and the ordinate indicates coupling loss (dB). As illustrated in FIGS. 9A and 9B, as the positional displacement of primary radiator 110 increases, the coupling loss increases.

Next, the influence of electromagnetic flux controlling members 120 and 420 on the coupling loss was examined. The frequency of the electromagnetic flux transmitted from radio wave source 111 was set to 270 GHz. As first antenna 112 and second antenna 132, a horn antenna for 270 GHz was used. The distance between primary radiator 110 and reception part 130 was set to 5000 mm. As the electromagnetic flux controlling member, electromagnetic flux controlling member 120 provided with no alignment layer 424 (Embodiment 1), electromagnetic flux controlling member 420 provided with alignment layer 424 in incidence surface 421 and emission surface 422 (Embodiment 2), and electromagnetic flux controlling member 420 provided with alignment layer 424 only in emission surface 422 (Embodiment 2) were used. Note that electromagnetic flux controlling members 120 and 420 were disposed only on the transmission side.

The vertex curvature radius at reference emission surface 522 of reference lens 520 is −0.790240706 (m), and reference emission surface 521 is a flat surface. The curvature is −1.25940766 (m−1), and the conic constant is −1.5217366. Note that reference lens 520 was set based on the above-described NPL 1.

Figure 10A:
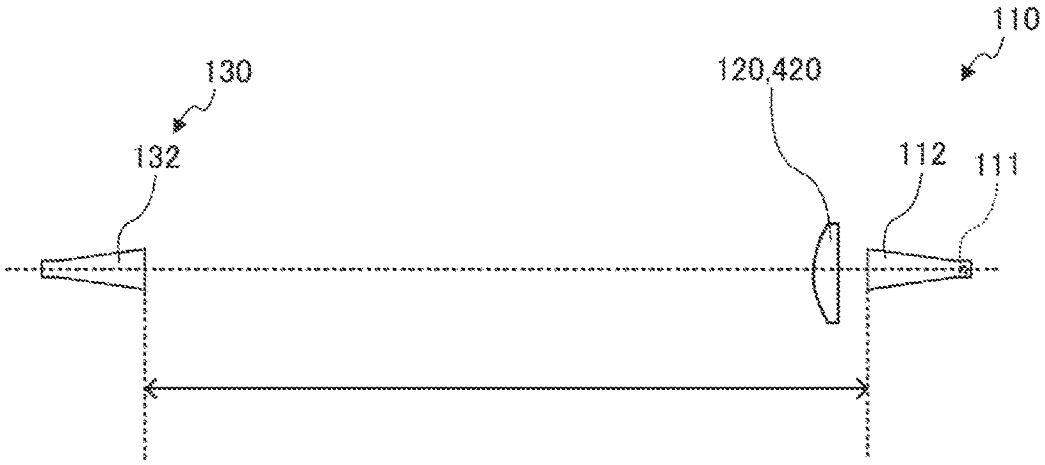
FIGS. 10A and 10B are diagrams for describing an influence of the electromagnetic flux controlling member regarding coupling loss.
Figure 10B:
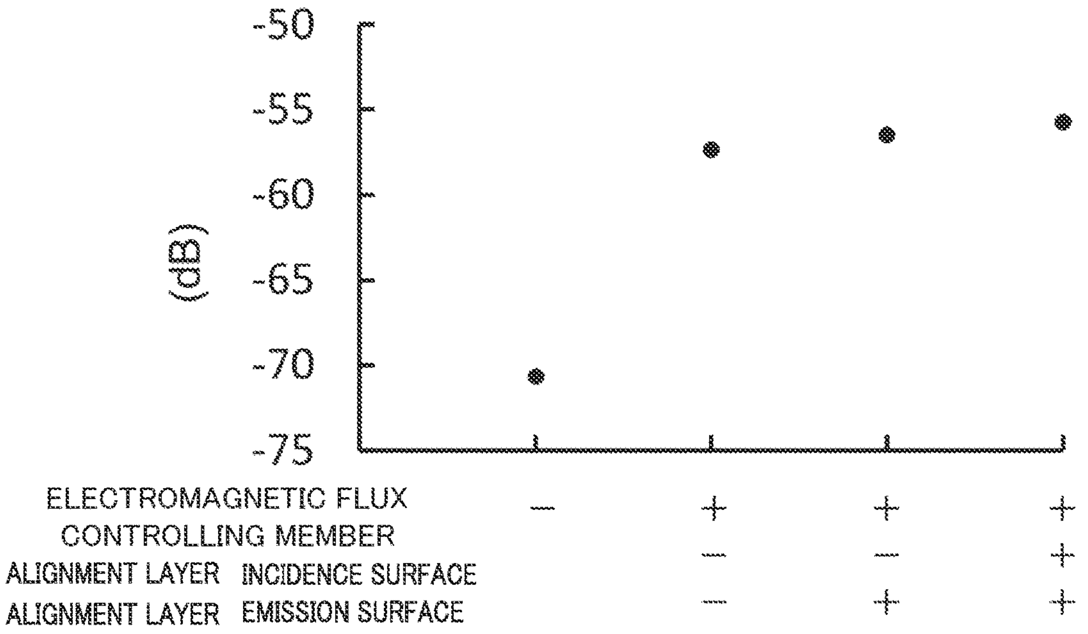

FIGS. 10A and 10B are diagrams for describing an influence of electromagnetic flux controlling member on the coupling loss. FIG. 10A is a diagram for describing a device configuration used for the simulation, and FIG. 10B is a graph showing a simulation result. In FIG. 10B, the ordinate indicates a coupling loss (dB). Note that in this simulation, primary radiator 110, electromagnetic flux controlling members 120 and 420, and reception part 130 are coaxially disposed such that the upper opening of primary radiator 110 is located at the focal position of electromagnetic flux controlling members 120 and 420.

As illustrated in FIGS. 10A and 10B, the coupling loss was suppressed with electromagnetic flux controlling member 120. In addition, the coupling loss was further suppressed with alignment layer 424 disposed at emission surface 422, and the coupling loss was further suppressed with alignment layer 424 disposed at emission surface 422 and incidence surface 421.

Next, the influence of the positional displacement of reference lens 520 and electromagnetic flux controlling members 120 and 420 on the coupling loss was examined. The frequency of the electromagnetic flux transmitted from radio wave source 111 was set to 270 GHz. As first antenna 112 and second antenna 132, a horn antenna for 270 GHz was used. The distance between primary radiator 110 and reception part 130 was set to 5000 mm. As the electromagnetic flux controlling member, electromagnetic flux controlling member 120 provided with no reference lens 520 and alignment layer 424 (Embodiment 1), and electromagnetic flux controlling member 420 with alignment layer 424 at incidence surface 421 and emission surface 422 (Embodiment 2) were used. Note that in this simulation, primary radiator 110, electromagnetic flux controlling members 120 and 420, and reception part 130 are coaxially disposed such that the upper opening of primary radiator 110 is located at the focal position of electromagnetic flux controlling members 120 and 420. Note that reference lens 520 was set based on the above-described NPL 1.

Figure 11A:
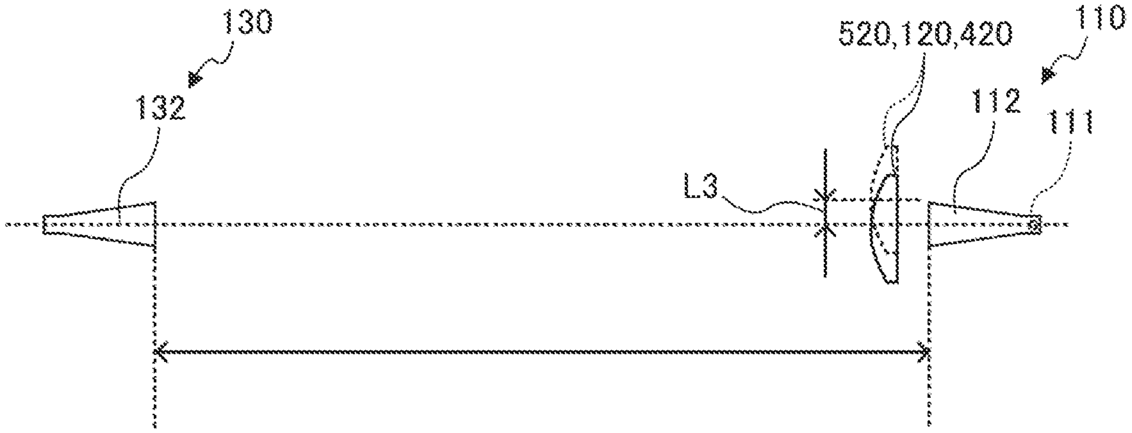
FIGS. 11A and 11B are diagrams for describing an influence of positional displacement of the electromagnetic flux controlling member regarding coupling loss.
Figure 11B:
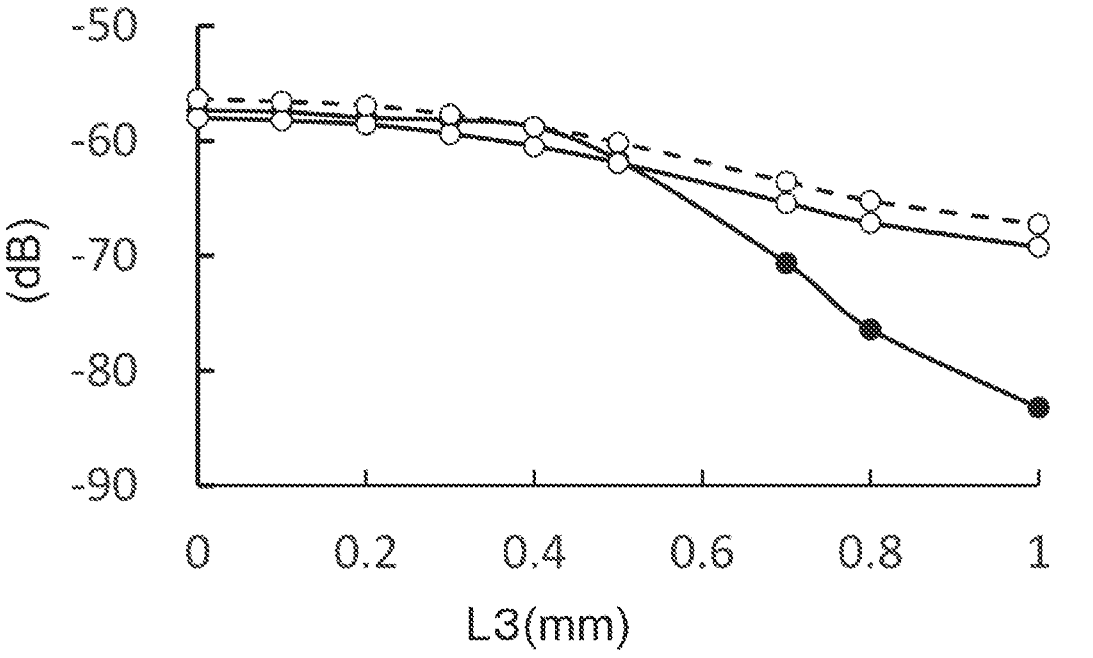

FIGS. 11A and 11B are diagrams for describing the influence of the positional displacement of reference lens 520 and electromagnetic flux controlling members 120 and 420 on the coupling loss. FIG. 11A is a diagram for describing a device configuration used for the simulation. FIG. 11B is a graph showing a simulation result. In FIG. 11B, the abscissa indicates deviation amount L3 (mm) of reference lens 520 and electromagnetic flux controlling members 120 and 420, and the ordinate indicates coupling loss (dB). In FIG. 11B, the solid line with black circular symbols represents results for reference lens 520, the solid line with white blank symbols represents results for electromagnetic flux controlling member 120 with no alignment layer 424 (Embodiment 1), and the broken line with white blank symbols represents results for electromagnetic flux controlling member 420 provided with alignment layer 424 at incidence surface 421 and emission surface 422 (Embodiment 2).

As illustrated in FIGS. 11A and 11B, it was confirmed that electromagnetic flux controlling member 120 according to Embodiment 1 (the solid line with white blank symbols) can suppress the coupling loss even in the case where there is a positional displacement in comparison with reference lens 520 (the solid line with black circular symbols). In addition, electromagnetic flux controlling member 420 according to Embodiment 2 (the broken line with white blank symbols) further suppressed the coupling loss even in the case where there is a positional displacement in comparison with reference lens 520 and electromagnetic flux controlling member 120.

Next, the influence of the curvature radius of emission surfaces 122 and 422 on the coupling loss was examined. The frequency of the electromagnetic flux transmitted from radio wave source 111 was set to 270 GHz. As first antenna 112 and second antenna 132, a horn antenna for 270 GHz was used. The distance between primary radiator 110 and reception part 130 was set to 5000 mm. As the electromagnetic flux controlling member, electromagnetic flux controlling member 120 (Embodiment 1) in which incidence surface 121 is composed of a flat surface, and the curvature radius of the vertex of emission surface 122 is −11 m or −12 m, and, incidence surface 121 and emission surface 122 are not provided with the alignment layer, and electromagnetic flux controlling member 420 in which incidence surface 421 and emission surface 422 are provided with alignment layer 424 (Embodiment 2) were used.

Figure 12A:
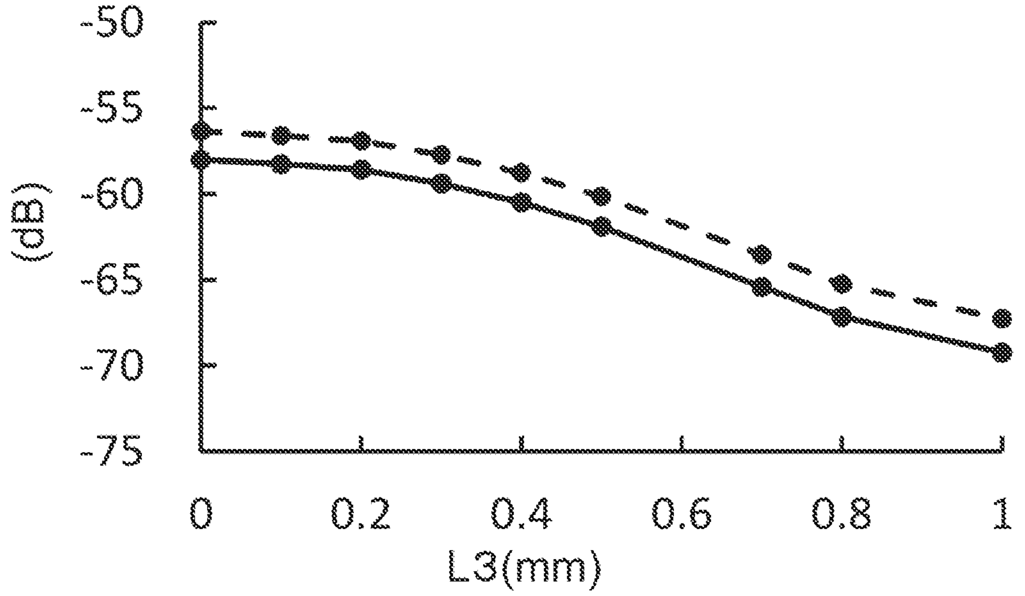
FIGS. 12A and 12B are graphs showing a simulation result of an influence of a curvature radius of an emission surface regarding coupling loss.
Figure 12B:
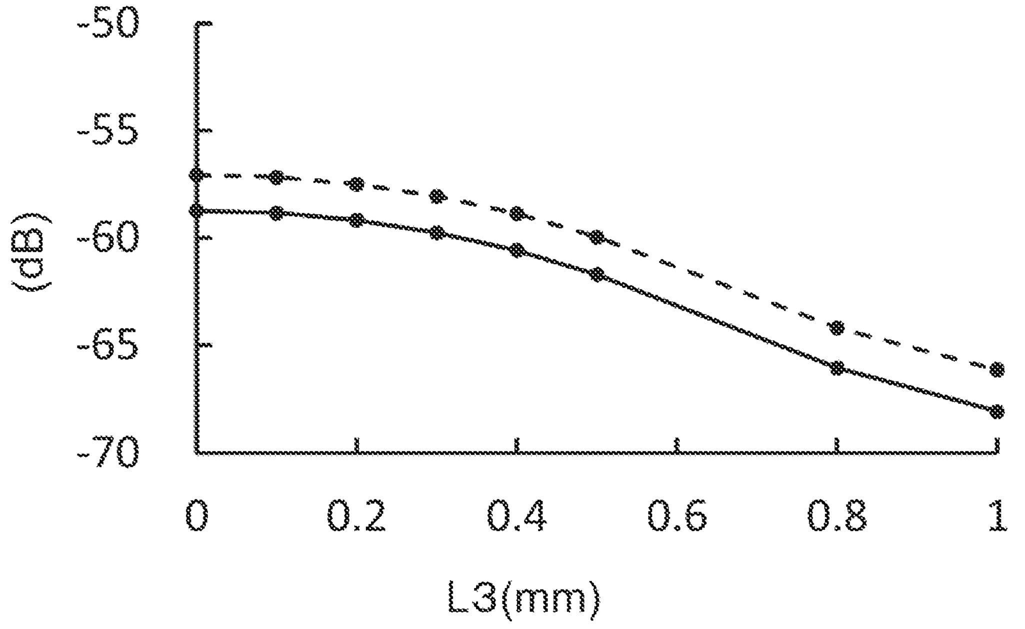

FIGS. 12A and 12B are graphs showing simulation results. In FIGS. 12A and 12B, the abscissa indicates deviation amount L3 (mm) of electromagnetic flux controlling members 120 and 420, and the ordinate indicates coupling loss (dB). In FIGS. 12A and 12B, the solid line represents results for electromagnetic flux controlling member 120 with a curvature radius of −11, and the dotted line represents results for electromagnetic flux controlling member 420 with a curvature radius of −12.

As illustrated in FIGS. 12A and 12B, electromagnetic flux controlling member 420 provided with alignment layer 424 suppressed the coupling loss even in the case where the position of the electromagnetic flux controlling member is displaced with respect to primary radiator 110 in comparison with electromagnetic flux controlling member 120 provided with no alignment layer 424. In addition, electromagnetic flux controlling member 420 with a curvature radius of −12 suppressed the coupling loss even in the case where the position of electromagnetic flux controlling member displaced with respect to primary radiator 110 in comparison with electromagnetic flux controlling member 120 with a curvature radius of −11. That is, the greater the curvature radius, the coupling loss can be suppressed even in the case where the position of the electromagnetic flux controlling member is displaced with respect to primary radiator 110.

INDUSTRIAL APPLICABILITY

The communication module of the present invention and the electromagnetic flux controlling member configured to be used for the communication module are useful in the radio communication field and the optical field.

REFERENCE SIGNS LIST

100, 400 Communication module
110 Primary radiator
111 Radio wave source
112 First antenna
120, 220, 420 Electromagnetic flux controlling member
121, 221, 421 Incidence surface
122, 222, 422 Emission surface
123 Side surface
130 Reception part
131 Receiver
132 Second antenna
424 Alignment layer
425 Protrusion
520, 620 Reference lens
521, 621 Reference incidence surface
522, 622 Reference emission surface
CA Central axis

The invention claimed is:

1. A communication module comprising:
a primary radiator configured to transmit an electromagnetic flux; and
an electromagnetic flux controlling member configured to control a travelling direction of the electromagnetic flux sent from the primary radiator,
wherein the electromagnetic flux controlling member includes:
an incidence surface configured to allow incidence of the electromagnetic flux sent from the primary radiator, and
an emission surface configured to emit to outside the electromagnetic flux entered from the incidence surface, and
wherein the incidence surface and the emission surface are configured such that the electromagnetic flux emitted from the emission surface is expanded than the electromagnetic flux transmitted from a focal position of a reference lens optimized to collimate the electromagnetic flux from the primary radiator and emitted after incidence on the reference lens on a basis of an emission angle of the electromagnetic flux emitted from the primary radiator, a dielectric constant of the electromagnetic flux controlling member, and an arbitrarily set focal length of the electromagnetic flux controlling member.

2. The communication module according to claim 1, wherein the reference lens includes:
a reference incidence surface corresponding to the incidence surface and configured to allow incidence of the electromagnetic flux, and
a reference emission surface corresponding to the emission surface and configured to emit, to outside, the electromagnetic flux entered from the reference incidence surface.

3. The communication module according to claim 2,
wherein when an absolute value of a vertex curvature radius of the reference incidence surface is greater than an absolute value of a vertex curvature radius of the reference emission surface when the absolute value of the vertex curvature radius of the reference incidence surface and the absolute value of the vertex curvature radius of the reference emission surface are compared with each other,
a vertex curvature radius of the incidence surface is the same as the vertex curvature radius of the reference incidence surface, and
an absolute value of a vertex curvature radius of the emission surface that is a convex surface is greater than the absolute value of the vertex curvature radius of the reference emission surface.

4. An electromagnetic flux controlling member configured to be used for the communication module according to claim 3.

5. The communication module according to claim 2,
wherein when an absolute value of a vertex curvature radius of the reference emission surface is greater than an absolute value of a vertex curvature radius of the reference incidence surface when the absolute value of the vertex curvature radius of the reference incidence surface and the absolute value of the vertex curvature radius of the reference emission surface are compared with each other, a vertex curvature radius of the emission surface is the same as the vertex curvature radius of the reference emission surface, and an absolute value of a vertex curvature radius of the incidence surface that is a concave surface is smaller than the absolute value of the vertex curvature radius of the reference incidence surface.

6. An electromagnetic flux controlling member configured to be used for the communication module according to claim 5.

7. An electromagnetic flux controlling member configured to be used for the communication module according to claim 2.

8. The communication module according to claim 1, wherein when a distance between the primary radiator and a reception part configured to receive the electromagnetic flux sent from the primary radiator is 5 m, the primary radiator and the reception part including a receiver are modules with the same configuration, and the primary radiator is disposed near the electromagnetic flux controlling member than the focal position of the reference lens, a coupling loss of the electromagnetic flux transmitted from the primary radiator and received by the reception part is within a range of 0 to −61 dB.

9. An electromagnetic flux controlling member configured to be used for the communication module according to claim 8.

10. The communication module according to claim 1, wherein when the primary radiator and a reception part configured to receive the electromagnetic flux sent from the primary radiator are separated from each other by a certain distance, the primary radiator and the reception part including a receiver use modules with the same configuration, and the primary radiator is disposed near the electromagnetic flux controlling member than the focal position of the reference lens, a coupling loss of the electromagnetic flux transmitted from the primary radiator and received by the reception part is within a range of 0 to −61 dB.

11. An electromagnetic flux controlling member configured to be used for the communication module according to claim 10.

12. The communication module according to claim 1, wherein the electromagnetic flux is a millimeter wave, a quasi-millimeter wave, or a terahertz wave.

13. An electromagnetic flux controlling member configured to be used for the communication module according to claim 12.

14. The communication module according to claim 1, wherein an alignment layer configured to suppress reflection of the electromagnetic flux is disposed at the incidence surface or the emission surface.

15. The communication module according to claim 14, wherein the alignment layer is a plurality of protrusions.

16. An electromagnetic flux controlling member configured to be used for the communication module according to claim 15.

17. An electromagnetic flux controlling member configured to be used for the communication module according to claim 14.

18. An electromagnetic flux controlling member configured to be used for the communication module according to claim 1.

* * * * *